US 8,246,464 B2

(12) United States Patent
Willis et al.

(10) Patent No.: US 8,246,464 B2
(45) Date of Patent: Aug. 21, 2012

(54) CACHING AND REPORTING SYSTEM FOR ACCELERATING COMBINED COMPUTER GAMING AND ADVERTISING

(75) Inventors: Daniel Willis, Stittsville (CA); Dhananjay Godse, Kanata (CA)

(73) Assignee: Google Inc., Mountain View, CA (US)

( * ) Notice: Subject to any disclaimer, the term of this patent is extended or adjusted under 35 U.S.C. 154(b) by 1405 days.

(21) Appl. No.: 11/303,966

(22) Filed: Dec. 19, 2005

(65) Prior Publication Data
US 2006/0135231 A1 Jun. 22, 2006

Related U.S. Application Data

(60) Provisional application No. 60/636,544, filed on Dec. 17, 2004.

(51) Int. Cl.
*A63F 9/24* (2006.01)
*A63F 13/00* (2006.01)
*G06F 17/00* (2006.01)
*G06F 19/00* (2006.01)

(52) U.S. Cl. ............................................ 463/42; 463/31

(58) Field of Classification Search ...................... 463/42
See application file for complete search history.

(56) References Cited

U.S. PATENT DOCUMENTS

| 5,152,011 | A | * | 9/1992 | Schwob | 455/158.5 |
|---|---|---|---|---|---|
| 5,712,916 | A | * | 1/1998 | Windel et al. | 380/51 |
| 5,724,424 | A | | 3/1998 | Gifford | |
| 5,816,918 | A | | 10/1998 | Kelly et al. | |
| 5,917,725 | A | * | 6/1999 | Thacher et al. | 700/91 |
| 5,941,772 | A | | 8/1999 | Paige | |
| 5,946,664 | A | | 8/1999 | Ebisawa | |
| 6,008,739 | A | * | 12/1999 | Hymel | 340/7.55 |
| 6,036,601 | A | * | 3/2000 | Heckel | 463/42 |
| 6,196,920 | B1 | * | 3/2001 | Spaur et al. | 463/42 |
| 6,285,985 | B1 | | 9/2001 | Horstmann | |
| 6,314,451 | B1 | * | 11/2001 | Landsman et al. | 709/203 |
| 6,513,052 | B1 | | 1/2003 | Binder | |
| 6,767,284 | B1 | * | 7/2004 | Koza | 463/29 |
| 6,928,414 | B1 | | 8/2005 | Kim | |
| 2001/0020236 | A1 | * | 9/2001 | Cannon | 707/1 |
| 2001/0034643 | A1 | * | 10/2001 | Acres | 705/14 |
| 2002/0004743 | A1 | | 1/2002 | Kutaragi et al. | |
| 2002/0120589 | A1 | | 8/2002 | Aoki | |
| 2004/0015608 | A1 | | 1/2004 | Ellis et al. | |
| 2004/0143495 | A1 | * | 7/2004 | Koenig | 705/14 |
| 2005/0246638 | A1 | | 11/2005 | Whitten | |

FOREIGN PATENT DOCUMENTS

EP 1 087 312 3/2001

* cited by examiner

*Primary Examiner* — Dmitry Suhol
*Assistant Examiner* — Kevin Y Kim
(74) *Attorney, Agent, or Firm* — Fish & Richardson P.C.

(57) ABSTRACT

A system supporting the presentation of advertisements within video game is described in which a memory cache stores advertising data that is used to provide the advertisements. The memory cache is managed via instructions provided by an external server via a network data connection. The management of the cache supports the storage of a variety of advertisements for a single advertisement opportunity. In addition, the cache management system is designed to supports numerous different video games on a same computing device.

22 Claims, 5 Drawing Sheets

CACHING AND REPORTING SYSTEM FOR ACCELERATING COMBINED COMPUTER GAMING AND ADVERTISING

This application claims benefit from U.S. Provisional Application No. 60/636,544 filed on Dec. 17, 2004, the entire contents of which is incorporated herein by reference.

FIELD OF THE IVNENTION

The instant invention relates generally to in-game advertising, and more particularly to a system and a method of local content cache manipulation for in-game advertising.

BACKGROUND OF THE INVENTION

The World Wide Web (WWW) has provided a very effective system for sharing information between computing devices. New applications that take advantage of the functionality of the WWW help to improve the popularity of the WWW. Increases in the number of users of the WWW serves to provide further incentive to develop new applications.

Computer gaming is an area has received major advances from WWW related developments. Since its origins, dating back to the early seventies of the last century, computer gaming has undergone a period of substantial growth. In addition, computer games that make use of the WWW have broadened their role to support social interactions and interpersonal relationships. Specifically, such games support what is called "on-line computer gaming". The seemingly ubiquitous nature of the Internet allows numerous games from all over the world the opportunity to interact together via on-line computer gaming.

Recently, computer gaming with on-line enabled platforms has gained tremendous popularity, and today thousands of gamers all around the world are playing relying on on-line connectivity. While some people stereotype such gamers as children most of whom are male, this is not accurate. Specifically gamers cover a wide range of ages. In addition, both females and males play computer games on-line. Predictably, the increasing computing power available to computing devices along with interactive on-line computer gaming are gradually providing convergence of games and entertainment media. Such convergence is believed to also provide numerous opportunities for new businesses.

Thus, due to their dynamic nature as well as due to their specific appeal to certain audiences, computer games and especially games played on Internet enabled platforms provide the ideal vehicle for dynamic advertising. Not only is it possible for an advertiser to directly target a specific group of customers, but advertisements directly incorporated into the computer games are also supported thereby providing product placement within the virtual environment of a video game. When presenting advertising data to a gamer during a video game session, it is important to provide the advertising data in an available fashion that does not compromise the quality of the advertisement or the quality of the game execution.

A method of providing advertising content when needed is to cache the advertising data within the gaming platform in anticipation of its being required. Then, when new advertising content is necessary, it merely replaces the existing advertising content. Unfortunately, this system supports advertisements displayed for long periods but is ill suited to rotating advertisements or to advertisements that change frequently.

It would be advantageous to provide a system and method that overcomes the disadvantages of the prior art.

SUMMARY OF THE INVENTION

In accordance with the invention there is provided a method comprising: executing a first video game session on a first computing device; allocating a portion of read-write memory of the first computing device for caching of advertising data therein; downloading advertising data from a remote server via a communications network; storing the advertising data in the portion of read-write memory; and, storing within memory a directory of contents of the portion of read-write memory.

In accordance with embodiments of the invention there is provided a method comprising: providing a read-write memory storage providing a video game; providing advertising spots within the game for impressing of advertising data therefrom; determining impressions of content within the advertising spots upon a gamer playing the video game; storing within the read-write memory storage first data relating to a plurality of impressions; and, at intervals, communicating an impression report in dependence upon the stored first data.

In accordance with another aspect of the invention there is provided a storage medium having instruction data stored therein, the instruction data for when executed resulting in performance of: executing a first video game session on a first computing device; allocating a portion of read-write memory of the first computing device for caching of advertising data therein; downloading advertising data from a remote server via a communications network; storing the advertising data in the portion of read-write memory; and, storing within memory a directory of contents of the portion of read-write memory.

In accordance with another embodiment of the invention there is provided a storage medium having instruction data stored therein, the instruction data for when executed resulting in performance of: providing a read-write memory storage providing a video game; providing advertising spots within the game for impressing of advertising data therefrom; determining impressions of content within the advertising spots upon a gamer playing the video game; storing within the read-write memory storage first data relating to a plurality of impressions; and, at intervals, communicating an impression report in dependence upon the stored first data.

In accordance with another aspect of the invention there is provided a system comprising: a first computing device comprising a read-write memory and a processor for: executing a first video game session on a first computing device; allocating a portion of read-write memory of the first computing device for caching of advertising data therein; downloading advertising data from a remote server via a communications network; storing the advertising data in the portion of read-write memory; and, storing within memory a directory of contents of the portion of read-write memory.

In accordance with another embodiment of the invention there is provided a system comprising: read-write memory; a processor for: providing a read-write memory storage; providing a video game; providing advertising spots within the game for impressing of advertising data therefrom; determining impressions of content within the advertising spots upon a gamer playing the video game; storing within the read-write memory storage first data relating to a plurality of impressions; and, at intervals, communicating an impression report in dependence upon the stored first data.

BRIEF DESCRIPTION OF THE DRAWINGS

The invention is now described with reference to the drawings in which.

DETAILED DESCRIPTION OF THE INVENTION

As the computing capability of personal computers and gaming console systems improve there is a strong motivation to provide increasingly realistic, and hence, more computationally intensive video games. Similarly, the cost of development of modern video games is very high and as more effort is placed in making the games more realistic their development costs increase. Impressing advertising from within video games is one way of mitigating the costs of developing a video game.

Figure 1:
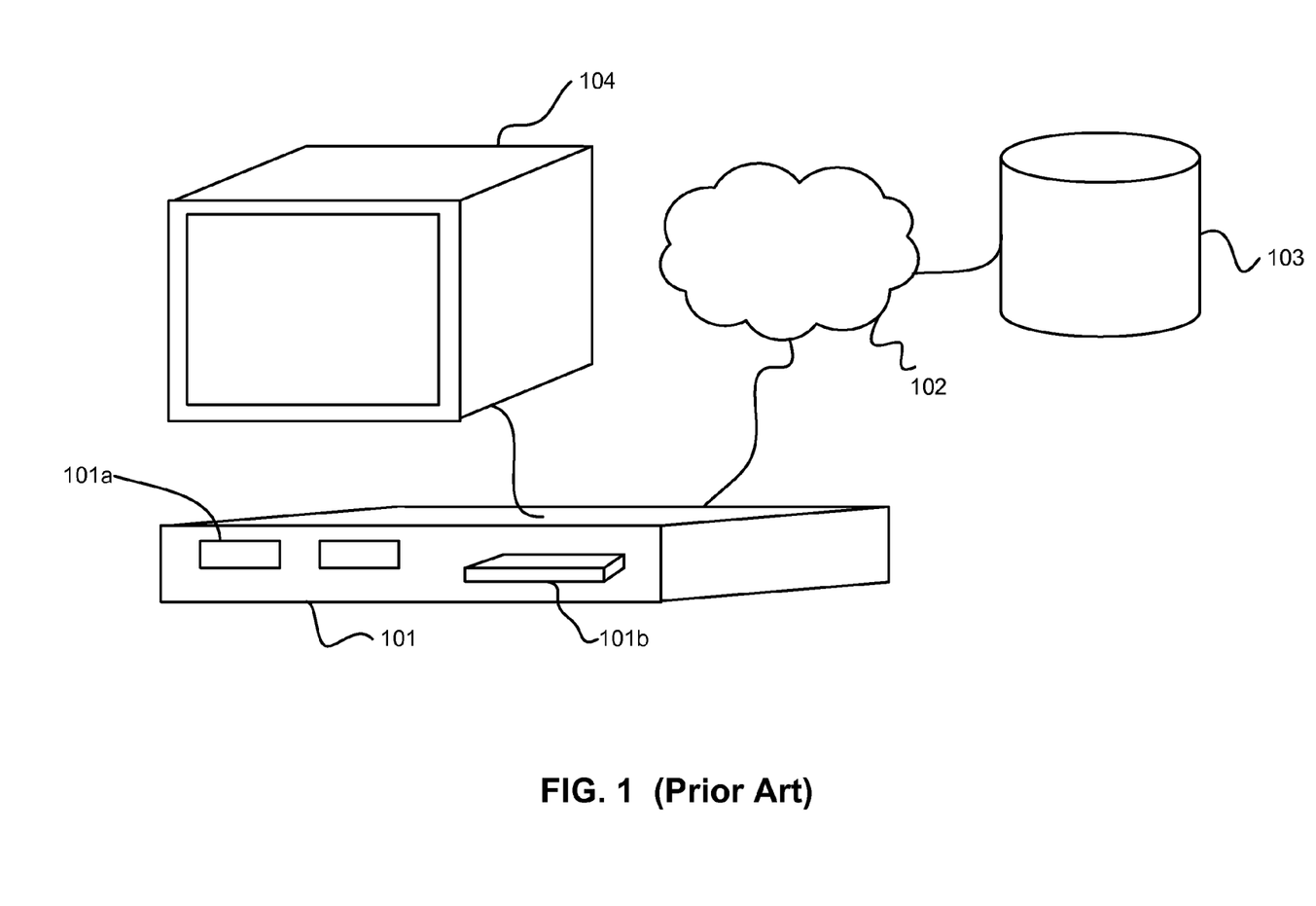
FIG. 1 is a diagram corresponding to a prior system used to provide dynamic advertisements in a video game.

Referring to FIG. 1, a prior art dynamic advertising system according to U.S. Pat. No. 5,946,664 by Ebisawa, issued 31 Aug. 1999 (Ebisawa) is shown. The system comprises: a computing device 101 supporting a memory 101a and a processor 101b; a public network 102, a server 103, and a display 104. In use, a gamer initiates a video game session on the computing device 101; the computing device 101 establishes a data connection path to the server 103 via the public network 102. Advertising data is provided from the server 103 to the computing device 101 and stored in the memory 101a. When the video game is in execution the processor 101b reads the advertising data present in the memory 101a and integrates it within the virtual environment of the video game. That advertisement is then presented on the display 104 as an image of the virtual environment.

The prior art of Ebisawa teaches playing a video game and receiving a new advertisement that is integrated into the video game each new day the game is played. Using the teachings of Ebisawa, it is clear that a game developer is able to integrate downloaded advertisements into a video game. While this is very beneficial, it is also somewhat crude. For example, if one were to play a video game in which a realistic urban environment is mimicked by a virtual environment of a video game it is clear that a wide variety of advertisements would be downloaded to make the environment realistic. For example, in the downtown section of most cities there are billboards and signs lining the streets. In addition, the make and model of an automobile also provides an advertising impression and large cargo trucks often have advertisements on their cargo boxes. Further still, people often wear clothing that promotes specific clothing manufacturers, professional sports teams, tourist destinations and other trademarked brands. Thus, using the teachings of Ebisawa it is not apparent how the advertisements would be stored, presented and managed to provide a realistic environment. Specifically, using the teachings of Ebisawa one might produce a video game that downloads data associated with an automobile. In a downtown scene it is not unlikely that twenty different automobiles would be visible. Clearly, if all of the automobiles appear generic then the sense of realism that the game developer would like to provide suffers. Conversely, if all the automobiles are the same make and model according to a same advertisement then the virtual environment is presented in a very unrealistic fashion. Finally, if all the automobiles are different, then storage required on the video game storage medium—DVD—is large and therefore might impinge on the game content, which would make the video game experience less enjoyable. The teaching of Ebisawa does not suggest how to manage the advertising data used to present advertisements.

Figure 2:
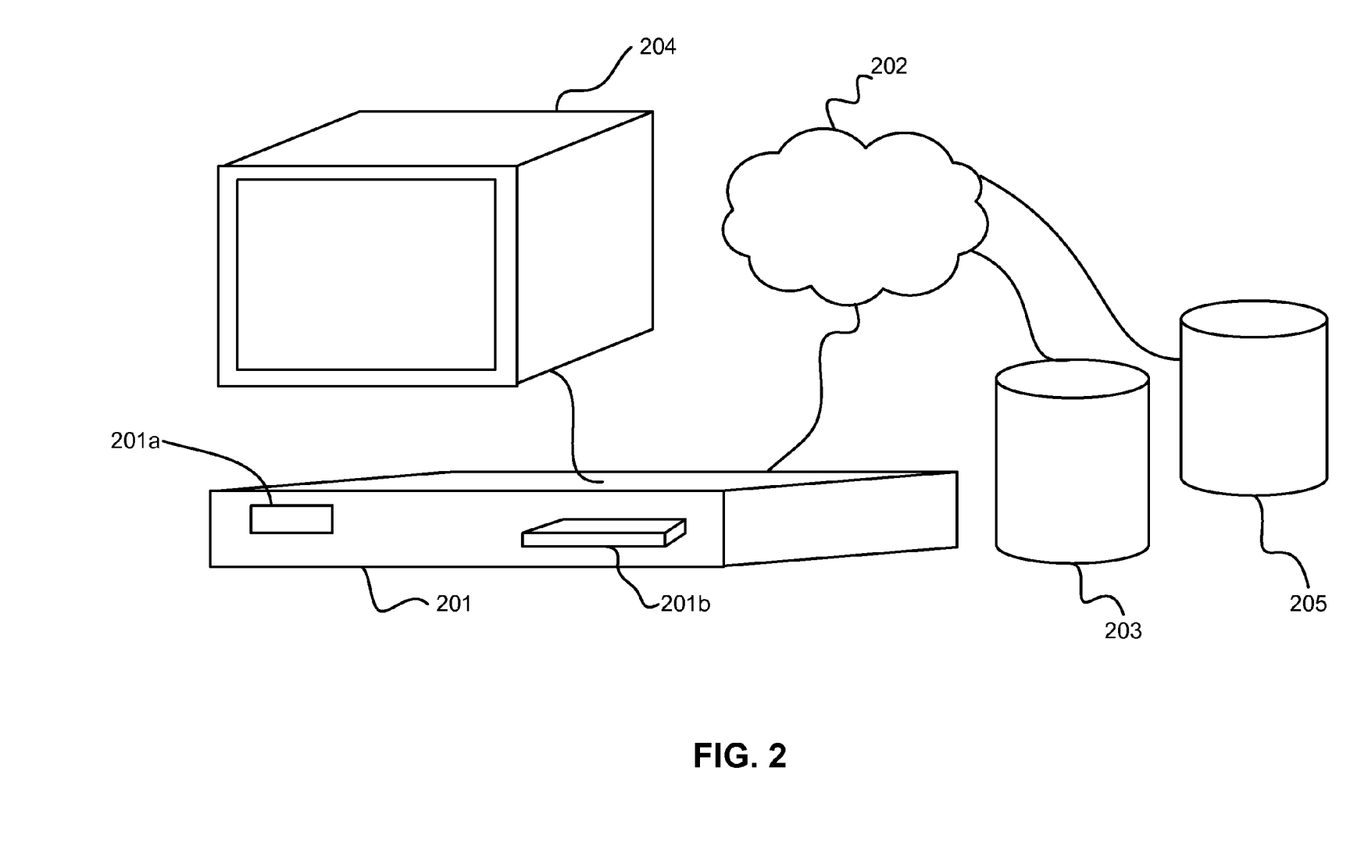
FIG. 2 is a diagram of a system according to a first embodiment of the invention that incorporates a broker server.

Referring to FIG. 2, a system according to a first embodiment is shown. The system comprises: a computing device 201 supporting a memory 201a and a processor 201b; a public network 202, such as the Internet, a broker server 203, a display 204, and an advertising server 205. In use, a portion of the memory 201a is designated for use as a memory cache that stores advertising data associated with the video game. Optionally, the memory 201a is a non-volatile memory and any advertising data present in a first video game session is assumed to be present in other video gaming sessions absent specific instructions to erase it from the cache or restrict its access to predetermined games. In use, a gamer initiates a video game session using the computing device 201. The video game software instructions executed by the processor 201b support the video game session. Using the processor 201b, the video game software detects a set of predetermined opportunities to impress advertisements from within the virtual environment of the video game. These opportunities are referred to as advertisement spots (ad spots).

Data relating the ad spots is provided to the broker server 203 via the public network 202. The broker server 203 directs the computing device 201 to an authorized advertising server 205. The advertising server 205 determines a set of advertisements that are consistent with the various ad spots. The advertising server 205 determines if there is sufficient memory available in the memory cache to receive the advertising data. When the size of the cache is insufficient, optionally additional memory is allocated to the memory cache. Alternatively, the memory cache size remains same and only a subset of advertising data is downloaded. This advertising data is then transferred to the computing device 201 and stored in the memory 201a. In addition to providing the advertising data, the advertising server 205 additionally provides campaign data to the computing device 201 regarding choosing advertising data for the ad spots. Thus, to use a simplified example, in the event that it is desired to simulate a highway with cars on it, the presence of a car is a type of ad spot. As the virtual environment of the video game is carefully mimicking a realistic environment it is important to provide a wide variety of different automobile data to support different instances of the same type of advertising spot. In this case, the ad spot is a virtual car. As it is desired to show a wide variety of different cars, it is desirable to have a variety of different advertising data relating to different cars. When a variety of different car producers choose to advertise this way, the mix of car brands is realistic and the type and frequency of cars shown is specified in the campaign data.

Using the data relating to the ad spots, the advertising server 205 provides guidelines for which automobiles are to be presented in the various instances of the ad spots. Thus, a relatively common model of automobile is more frequently presented than an exotic car in accordance with the guidelines. In this way, the highway environment is realistically portrayed. Alternatively, an advertiser that pays more is more represented on the highway than an advertiser that pays less. Clearly, other media, such as images on billboard signs and a song that plays on a car stereo of a virtual car are also treated in an analogous fashion. Specifically, for a given ad spot multiple advertisements, in the form of advertising data, are supported. Thus, in the case of the car stereo clearly once a song finishes, it is desirable to provide a new song. In this way, the providing of an environment that is not overly repetitive results. Using the car stereo example, the gamer optionally provides an input signal to the virtual car stereo when the music provided in the video game is not to their liking. The video game then simulates changing radio stations by prematurely ending a current music track and providing a different music track.

A person of skill in the art will appreciate that a wide variety of guidelines are optionally supported. For example, one simple guideline is to provide the advertisements for a given ad spot in a predetermined order. Thus, when it is specified to have more of one type of advertisement than another, it is a simple matter to make additional copies of the advertising data that is to be provided more frequently. Clearly, other options are supported, for example, the advertising server 205 optionally specifies that advertising data associated with a specific advertisement is only to be presented a fixed number of times and counter is maintained to record the number of times the advertisement is presented. Once the counter reaches the predetermined value the computing device attempts to make contact with the advertising server 205 to initiate a cache management event. In this case, the computing device established data communications with the broker server and reports that the advertisement has been presented the predetermined number of times. Alternatively, a relative frequency of a present set of advertising data is dependent on providing other advertising data. For example, as it is desirable to only show an exotic car on occasion one might choose to specify that an exotic car is only presented after showing one hundred advertisements corresponding to other cars that are more conventional. A person of skill in the art will appreciate that a computing device is capable of providing advertisements in accordance with guidelines consistent with a variety rules. As previously mentioned the advertising server 205 specifies the guidelines by providing data in association with the advertising data. Thus, the advertising data present within the memory 201a of the computing device 201 is "managed" by a remote computing device. Optionally, advertising data is only provided to and removed from the memory 201a when the computing device 201 is in data communications with the advertising server 205.

It is apparent that in many cases it is not practical to download all of the advertising data each time a video game session is initiated. Thus, in a second embodiment, prior to providing data relating the ad spots to the advertising server 205, the computing device 201 reviews the memory 201a for existing advertising data. When advertising data is identified, advertisement identity data sufficient for identifying the advertising data is reported when the advertising server 205 is contacted. The advertising server 205 uses the advertisement identity data to determine a set of advertising data currently present within the memory 201b of the computing device 201. The advertising server 205 then determines a set of desired advertising data. Clearly, when the advertising server 205 specifies that advertising data currently present in the memory 201a is desired there is no rational for downloading it to the memory 201a. Thus, the advertising server 205 acts to provide only that advertising data that is not currently present within the memory 201a. This serves to reduce the length of time used to download advertising data to the computing device 201. Clearly, this is particularly useful when a large non-volatile memory suitable for storing advertising data is available to the computing device.

Preferably, the reported advertising data includes information sufficient for identifying the advertising data uniquely. Typically, this includes an identifier, a version number, and potentially some of the campaign data associated therewith.

Figure 3:
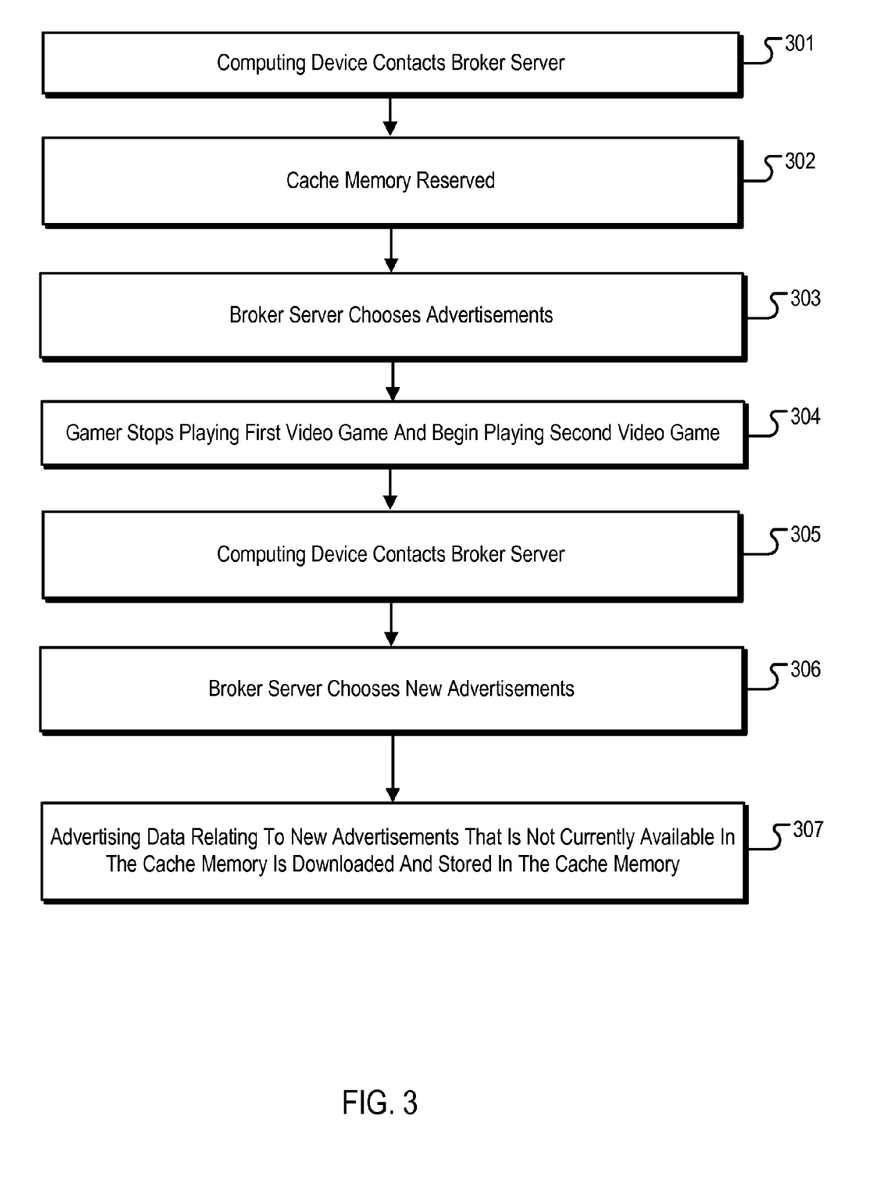
FIG. 3 is a flowchart according to a second embodiment of the instant invention in which a memory cache stores advertising data and a plurality of video games optionally use the same advertising data.

A memory cache is used for storing the advertising data. Each video game that supports dynamic advertising with a similar cache management process via the same computing device reserves a different portion of the memory as an advertising data cache. Alternatively, each video game relies on a same cache and stores advertising data within a same portion of a same cache. Referring to FIG. 3, a flowchart according a third embodiment is shown. A computing device supporting a first video game session initiates contact with a broker server via a public network 301, the first video game session associated with a first video game. A portion of a memory of the computing device is reserved as a memory cache for storing advertising data 302. The advertising data comprises media data for presenting an advertisement within a video game session as well as campaign data that is used to assist in managing the advertising data. In a simple case, the campaign data comprises a counter value that is decremented each time the media data is presented by the computing device. The advertising server specifies a set of advertising data 303. Advertising data specified by the advertising server that is not already present with the memory cache is loaded to the computing device via the public network and stored in the memory cache. The memory cache is not associated with one specific video game. Instead it is available for use by a common set of video games.

The gamer stops playing the first video game and begins playing a second, other video game using the computing device 304. The first and second video games support a common set of rules for providing advertisements in video games. When the second video game is executed by the computing device, the computing device establishes data communications with the broker server 305. The broker server directs the computing device to communicate with an advertising server. The computing device provides data detailing what advertising data it currently has available in the memory cache. The advertising server determines a set of advertisements. Advertising data for providing advertisements specified by the advertising server that is not already present with the memory cache is downloaded to the computing device via the public network and stored in the memory cache 306. Clearly, it is beneficial to reduce a likelihood of storing redundant advertising data. In this way, the memory cache supports a wide variety of different advertisements each relating to one or more video games. Clearly, updating the memory cache and purging old advertising data is carried out according to a common set of rules specified by the broker server and the advertising server. Thus, in a first mode of operation, each advertisement is provided with a counter and when the counter reaches a predetermined value the advertisement is flagged as being old. Alternatively in a second mode of operation each advertisement is provided with a counter for different games supported by the computing device. Thus, if a same advertisement is provided in driving game and a flying game there is a first counter associated with providing the advertisement in the driving game and a second counter associated with providing the advertisement in the flying game. In addition, other video games executed by the computing device also support the same copy of the advertisement by incrementing other counters. Additional information regarding acquiring and providing metrics data for advertising in video games is provided in U.S. patent application 60/636,543, filed 17 Dec. 2004.

Alternatively, the advertisement is provided with a temporal indicator indicating when the advertisement is stale. An advertisement is stale when it is no longer current and is therefore unnecessary. When stale, an advcertisement is available to be purged from the cache.

Figure 4:
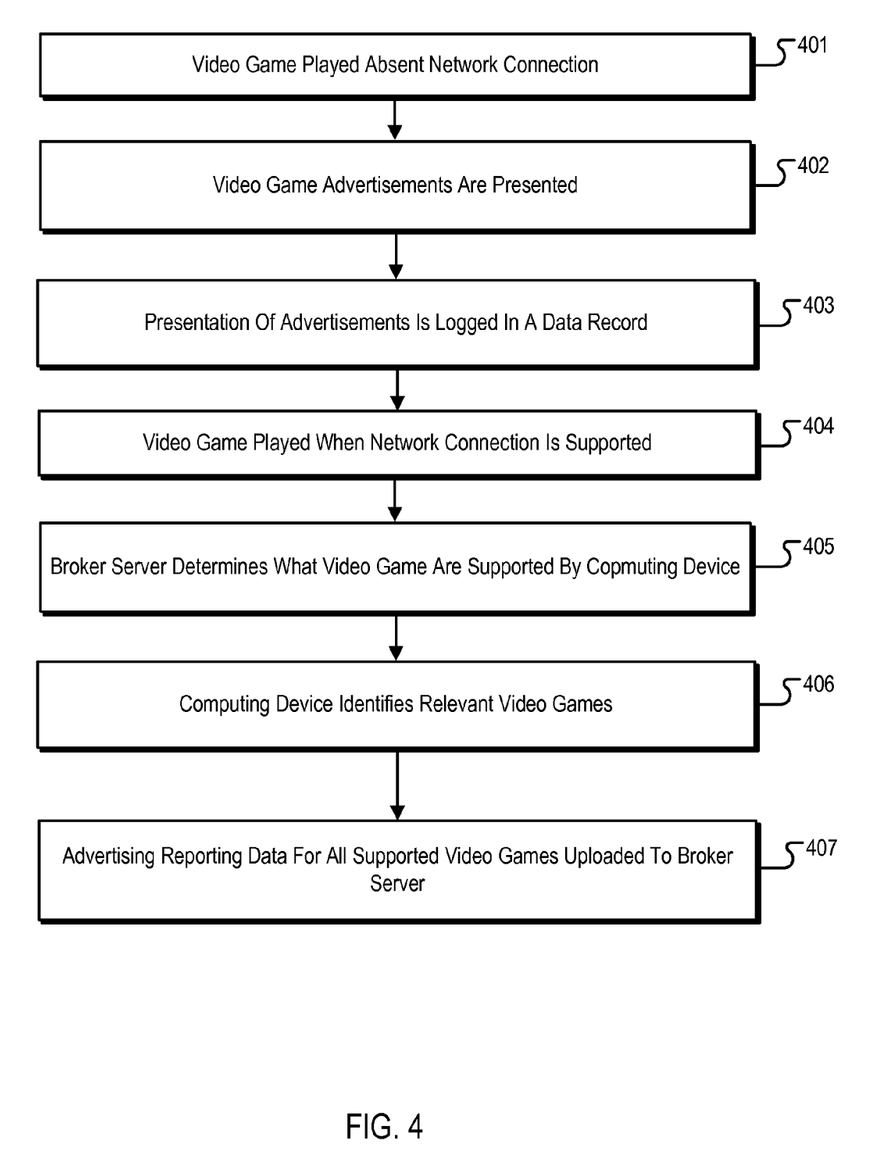
FIG. 4 is a flowchart according to a third embodiment of the invention which data relating to the presentation of advertisements within a video game is provided for a set of related video games; and, FIG. 5 is flowchart according to a fourth embodiment of the invention in which advertising data used in a plurality of video games is stored in a common cache and reported.

In order to provide a solid business case to support advertising in video games, it is desirable to be able to provide data indicative of impression metrics for advertisements impressed thereby. In U.S. Pat. No. 6.036,601 by Heckel, issued 14 Mar. 2000 (Heckel) a system for reporting the presentation of an advertisement within a video game is provided. The method of Heckel relies upon providing video game software with a plug-in that supports the presentation and recording of the presentation of advertisements. As the data is transferred by a plug-in associated with a specific game, it is apparent that the plug-in only reports the presentation of advertisements associated with the video game that has the plug-in. Clearly, the prior art of Heckel is highly beneficial when the gamer plays their video game while their computing device supports a network data connection with an external server, as would be the case when one plays against other gamers via an Internet connection. In the event that the gamer registers their software but does not play the video game while supporting an Internet data connection then the advertisements are shown but not reported according to the teaching of Heckel. In contrast, a video game advertising system that supports a memory cache need not be limited to providing advertisement reporting data—impression data—when the gamer is playing the video game while supporting an Internet connection. Specifically when the memory cache is provided at a predetermined memory location, another program is optionally used to transfer the reporting data. Referring to FIG. 4, an embodiment is shown in which a computing device supports five different video games that all support video game advertising using a common system supported by a common broker server. Each of the video games has a separate memory cache for storing advertising data. In addition, each of the sets of advertising data within the memory caches supports reporting information associated with prior presentation of the advertisements. Advertising data along with campaign data for providing guidelines relating to impressing of the advertising data is provided when the gamer registers the video game. Alternatively, default advertising content and default campaign data are provided with non-volatile storage medium provided with the video game, such as a CD-ROM. The advertising data is provided according to the campaign data within each of the five video games as the gamer plays the games. Of the five video games, the gamer plays all five but only plays one of the five while connected to the Internet. Specifically, the other four video games are played while the computing device of the gamer does not support a network connection and therefore while playing any of these four games, the computing device is unable to establish a data communications path to the broker server.

Using the present embodiment, the reporting data associated with the aforementioned four video games is optionally reported to the broker when the gamer plays the fifth video game while supporting a network connection. Specifically, the gamer plays video games absent an active Internet connection 401. During the course of gameplay, advertisements within the video games are presented to the gamer 402. The video games support a common standard for recording and reporting the presentation of advertising content. The presentation of the advertisements is recorded for later uploading to a broker 403. The gamer then initiates a video game session while supporting a network connection. During the video game session, a computing device supporting the video game session establishes a data connection to a broker server 404. The broker server queries the computing device to determine if the computing device supports other video games that also support the same broker server and if these video games have reporting data 405. The computing device identifies such video games and identifies reporting data associated with each of the video games 406. The computing device then uploads the advertising reporting data—impression metrics data—for each of the video games 407. Once the record data is provided to the broker the records are reset to a default condition indicating that all presentation of the advertisement have been reported. Alternatively, history data is maintained for use by the video game software. Clearly, a gamer may play a game frequently but with most of their gaming sessions played alone, while another is frequently played in competition with other gamers via an Internet connection. When an Internet connection is not always available, the gamer often chooses not to enable the Internet connection unless necessary. It is clear that in the present embodiment all of the reporting data is provided to the broker unless none of the games are played while the computing device is in communication with the broker server.

Figure 5:
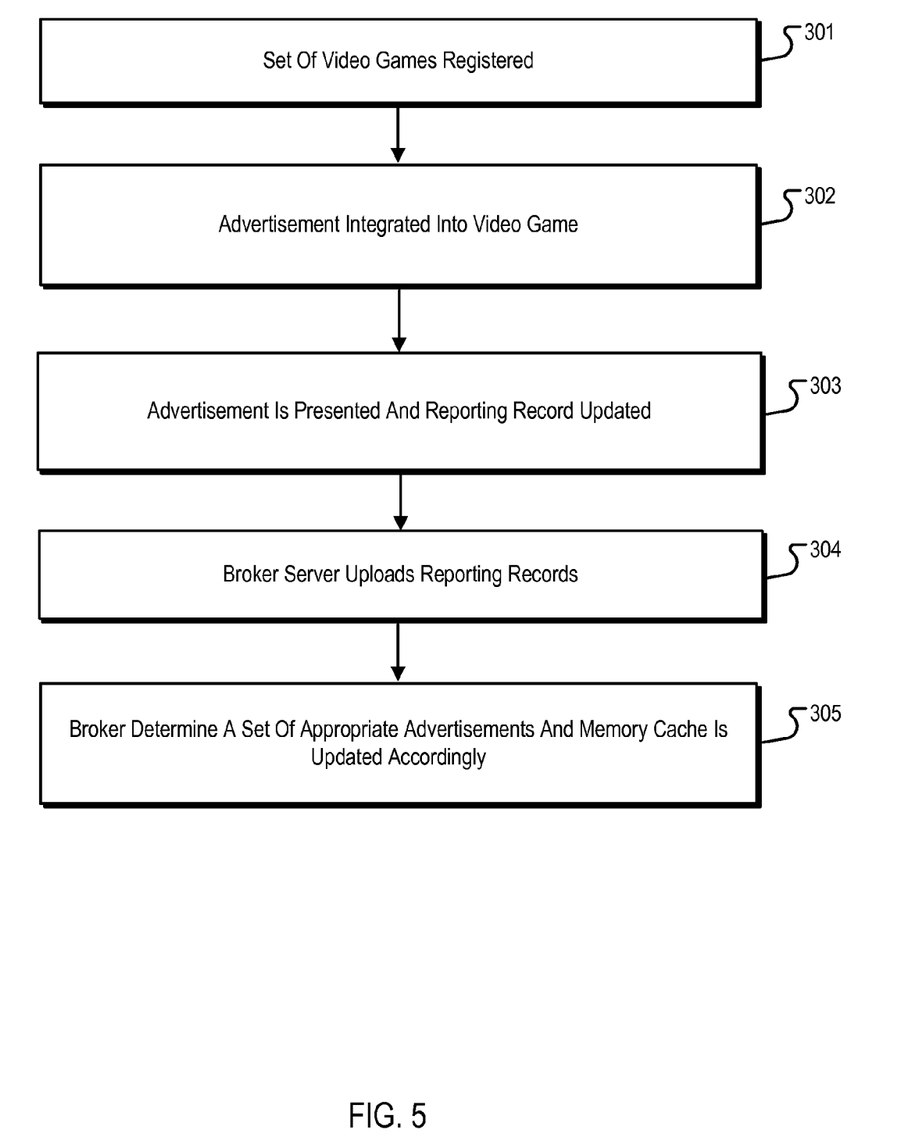

Referring to FIG. 5, a flowchart in accordance with another embodiment is presented making use of a shared memory cache that stores advertising data that is used to provide advertisements in a wide variety of different video games each of which support the use of the shared cache. In use, a gamer acquires and registers a set of video games 501. Each of the video games supports the use of a shared memory cache for storing advertising data. During a registration process associated with a video game, a network data communications path is established between a broker server and the computing device. The broker server directs the computing device to initiate communications with an advertising server. The advertising server queries the computing device to determine if a memory cache has been established for storing advertising data. If no memory cache is present then memory for a memory cache is reserved and, optionally, advertising data for integration in ad spots within the video game is downloaded and stored in the memory cache. Since the memory cache is shared, it is unnecessary to provide duplicates of advertising data. When one of the video games is played by the gamer, the computing device loads advertising data from the cache and integrates it into an ad spot within the played video game 502. The resulting advertisement is presented and the computing device updates a reporting record indicating that the advertisement has been presented 503. The reporting record comprises data that is optionally updated by each of the video games. The presentation of an advertisement and the recording of the presentation need not involve transferring data to broker server. While this is detrimental in the sense that the reporting of an advertisement is not carried out immediately, it provides the benefit of not interrupting the gaming session and not inundating the broker server with many very small impression reports. Specifically, when there is a very large number of concurrent impressions, there is a risk that a large number of reports generated and transmitted in a short period may affect game play. Some very popular on-line video games are known to millions of independent users. If such a game incorporates advertising then the corresponding broker server is likely to have a very large number of requests to transfer data. Thus, reporting record is stored until a portion of a gameplay session is reached in which some latency in a data communications path between the computing device, the advertising server and, the broker server will not adversely affect the experience of the video game in a substantial fashion. Thus, it is suggested that the reporting data is provided when one of: a new video game session is initiated and, a video game session is ended. Alternatively, reporting occurs at each level transition. Thus, when the time comes to provide data from the reporting record to broker server, the reporting record is likely to comprise data indicative of the delivery of a plurality of advertisements. This reduces the number of requests to provide data to the broker server in comparison to sending data each time an advertisement is shown. In addition, when video game is played while not external network connection is supported, a reporting record indicative of the presentation of the advertisement is stored. Thus, if the gamer plays only one game using an Internet connection, the reporting record still provides information relating to the presentation of advertisements in all of the video games. The reporting records are uploaded to the broker server 504. The broker server determines a set of appropriate advertisements and the advertising data currently stored within the memory cache is updated accordingly 505. Clearly, as the memory cache is shared, the advertisements that are normally shown in the video games that are played without supporting a network connection are updated.

Optionally, the reporting records are uploaded to the broker server and new advertising data is optionally provided to the memory cache each time a video game is registered. In this way, gamers who register their games but do not play video games online still provided their reporting records and are able to receive new advertisements.

Numerous other embodiments of the invention will be apparent to one skill in the art without departing from the spirit and scope of the invention.

What is claimed is:

1. A method comprising:
    allocating a portion of read-write memory on a gaming device as a shared memory cache accessible by each of a plurality of distinct games software that have been installed on the gaming device and registered with a common advertising broker, for storing respective impression metrics collected during execution of the distinct game software;
    executing a first distinct game software among the plurality of distinct game software on the gaming device, the first distinct game software being enabled to communicate with a server through a communication channel established for the first distinct game software;
    accessing the shared memory cache through the first distinct game software in execution to obtain the respective impression metrics of a second distinct game software of the plurality of distinct game software, the respective impression metrics having been stored by the second distinct game software during prior execution of the second distinct game software on the gaming device; and
    transmitting, through the first distinct game software in execution, the obtained impression metrics to the server through the communication channel established for the first distinct game software.

2. The method according to claim 1 comprising:
    communicating with the server to identify advertising data stored within the shared memory cache that are stale; and
    removing the stale advertising data from the shared memory cache.

3. The method according to claim 1 comprising:
    communicating with the server to identify advertising data stored within the shared memory cache that are to be replaced;
    downloading replacement advertising data from the server; and
    replacing the advertising data that is to be replaced with the downloaded replacement advertising data.

4. The method according to claim 3 wherein downloading is performed within a low priority task.

5. The method according to claim 1 comprising:
    adjusting a size of the shared memory cache when the size of the shared memory cache is insufficient for storing all the advertising data and impression metrics for the plurality of distinct game software.

6. The method according to claim 1 comprising:
    determining an advertising spot within a game provided by the first distinct game software during execution of the first distinct game software;
    identifying advertising data corresponding to a plurality of advertisements, each of the advertisements suitable for integration in the advertising spot; and
    providing an advertisement of the plurality of advertisements for impressing upon a gamer via the advertising spot.

7. The method according to claim 1 comprising:
    prior to execution of the first distinct game software:
        executing the second distinct game software on the gaming device;
        determining an advertising spot within a game provided by the second distinct game software during execution of the second distinct game software;
        identifying advertising data corresponding to an advertisement suitable for integration in the advertising spot; and
        providing an advertisement for impressing upon a gamer via the advertising spot.

8. The method according to claim 7 comprising:
    determining impression metrics relating to the impressed advertisement; and
    storing the impression metrics of the second distinct game software in the shared memory cache.

9. The method according to claim 6 comprising:
    determining impression metrics relating to the impressed advertisements; and
    transmitting the impression metrics of the first distinct game software to the server.

10. The method according to claim 1 comprising:
    upon detecting one of an initiation of a gaming session and termination of a gaming session of the first distinct game software on the gaming device:
        transmitting a report based on the impression metrics stored in the shared memory location to the server; and
        updating the impression metrics stored within the shared memory cache in response to the transmitting.

11. The method according to claim 1 comprising:
    determining that existing advertising data within the shared memory cache corresponds to advertising data to be downloaded for the first distinct game software; and
    preserving the existing advertising data content for use by the first game software during game execution.

12. The method according to claim 1 wherein the advertising data includes campaign data associated with advertising content, the campaign data indicating one of a temporal length of time for the campaign, a number of impressions for the campaign, and a frequency of impressions for the campaign.

13. The method according to claim 12 wherein the campaign data comprises data indicating a temporal length of time and wherein upon expiry of the temporal length of time, the advertising data is cleared from the shared memory cache.

14. The method according to claim 12 wherein the advertising data includes campaign data associated with advertising content, the campaign data comprises data indicating a frequency and wherein the advertisement content is impressed from within a video game with the frequency.

15. A method comprising:
establishing a communication channel for a first distinct game software executing on a gaming device, the first distinct game software being one of a plurality of distinct games software that have been installed on the gaming device and registered with a common advertising broker, the gaming device having a portion of its read-write memory allocated as a shared memory cache accessible by each of plurality of distinct game software for storing respective impression metrics collected during execution of the distinct game software;
querying the first distinct game software in execution through the communication channel for the respective impression metrics of a second distinct game software of the plurality of distinct game software; and
receiving, through the first distinct game software in execution and through the communication channel established for the first distinct game, the respective impression metrics of the second distinct game software from the gaming device, the respective impression metrics having been stored in the shared memory cache by the second distinct game software during prior execution of the second distinct game software on the gaming device.

16. The method according to claim 15, wherein the receiving further comprises receiving the impression metrics at an initiation of a game provided by the first distinct game software.

17. The method according to claim 15, wherein the receiving further comprises receiving the impression metrics during level transitions within a game provided by the first distinct game.

18. The method according to claim 15, further comprising:
providing advertising content to the shared memory cache through the first distinct game software in execution; and
impressing the advertising content upon a gamer of a game provided by the first distinct game software in execution from an advertising spot in the game.

19. A non-transitory computer-readable medium having instructions stored thereon, which, when executed by a processor, cause the process to perform operations comprising:
allocating a portion of read-write memory on a gaming device as a shared memory cache accessible by each of a plurality of distinct games software that have been installed on the gaming device and registered with a common advertising broker, for storing respective impression metrics collected during execution of the distinct game software;
executing a first distinct game software among the plurality of distinct game software on the gaming device, the first distinct game software being enabled to communicate with a server through a communication channel established for the first distinct game software;
accessing the shared memory cache through the first distinct game software in execution to obtain the respective impression metrics of a second distinct game software of the plurality of distinct game software, the respective impression metrics having been stored by the second distinct game software during prior execution of the second distinct game software on the gaming device; and
transmitting, through the first distinct game software in execution, the obtained impression metrics to the server through the communication channel established for the first distinct game software.

20. A non-transitory computer-readable medium having instructions stored thereon, which, when executed by a processor, cause the process to perform operations comprising:
establishing a communication channel for a first distinct game software executing on a gaming device, the first distinct game software being one of a plurality of distinct games software that have been installed on the gaming device and registered with a common advertising broker, the gaming device having a portion of its read-write memory allocated as a shared memory cache accessible by each of the plurality of distinct games software for storing respective impression metrics collected during execution of the distinct game software;
querying the first distinct game software in execution through the communication channel for the respective impression metrics of a second distinct game software of the plurality of distinct game software; and
receiving, through the first distinct game software in execution and through the communication channel established for the first distinct game, the respective impression metrics of the second distinct game software from the gaming device, the respective impression metrics having been stored in the shared memory cache by the second distinct game software during prior execution of the second distinct game software on the gaming device.

21. A system comprising:
one or more processors;
memory coupled to the one or more processors and operable for storing instructions, which, when executed by the one or more processors, cause the one or more processors to perform operations, comprising:
allocating a portion of read-write memory on a gaming device as a shared memory cache accessible by each of a plurality of distinct game software that have been installed on the gaming device and registered with a common advertising broker, for storing respective impression metrics collected during execution of the distinct game software;
executing a first distinct game software among the plurality of distinct games software on the gaming device, the first distinct game software being enabled to communicate with a server through a communication channel established for the first distinct game software;
accessing the shared memory cache through the first distinct game software in execution to obtain the respective impression metrics of a second distinct game software of the plurality of distinct game software, the respective impression metrics having been stored by the second distinct game software during prior execution of the second distinct game software on the gaming device; and
transmitting, through the first distinct game software in execution, the obtained impression metrics to the server through the communication channel established for the first distinct game software.

22. A system comprising:
one or more processors;
memory coupled to the one or more processors and operable for storing instructions, which, when executed by the one or more processors, cause the one or more processors to perform operations, comprising:

establishing a communication channel for a first distinct game software executing on a gaming device, the first distinct game software being one of a plurality of distinct games software that have been installed on the gaming device and registered with a common advertising broker, the gaming device having a portion of its read-write memory allocated as a shared memory cache accessible by each of the plurality of distinct game software for storing respective impression metrics collected during execution of the distinct game software;

querying the first distinct game software in execution through the communication channel for the respective impression metrics of a second distinct game software of the plurality of distinct game software; and receiving, through the first distinct game software in execution and through the communication channel established for the first distinct game, the respective impression metrics of the second distinct game software from the gaming device, the respective impression metrics having been stored in the shared memory cache by the second distinct game software during prior execution of the second distinct game software on the gaming device.

\* \* \* \* \*

UNITED STATES PATENT AND TRADEMARK OFFICE
CERTIFICATE OF CORRECTION

Page 1 of 2

PATENT NO. : 8,246,464 B2
APPLICATION NO. : 11/303966
DATED : August 21, 2012
INVENTOR(S) : Daniel Willis It is certified that error appears in the above-identified patent and that said Letters Patent is hereby corrected as shown below:

Column 9, Line 36; replace:
"a plurality of distinct games software that have been" with
-- a plurality of distinct game software that have been --

Column 11, Line 12; replace:
"games software that have been installed on the gaming" with
-- game software that have been installed on the gaming --

Column 11, Line 16; replace:
"by each of plurality of distinct game software for storing" with
-- by each of the plurality of distinct game software for storing --

Column 11, Line 16; replace:
"a plurality of distinct games software that have been" with
-- a plurality of distinct game software that have been --

Column 12, Line 12 (approx.); replace:
"games software that have been installed on the gaming" with
-- game software that have been installed on the gaming --

Column 12, Line 16 (approx.); replace:
"by each of the plurality of distinct games software for" with
-- by each of the plurality of distinct game software for --

Column 12, Line 45; replace:
"rality of distinct games software on the gaming" with
-- rality of distinct game software on the --

Signed and Sealed this
Twelfth Day of February, 2013

Teresa Stanek Rea
*Acting Director of the United States Patent and Trademark Office*

Column 13, Line 4; replace:
"distinct games software that have been installed on the" with
-- distinct game software that have been installed on the --